United States Patent
Perry

(10) Patent No.: US 7,110,368 B2
(45) Date of Patent: Sep. 19, 2006

(54) SYSTEM AND METHOD FOR DISTRIBUTED MULTI-PARTY CALL CONTROL

(75) Inventor: Matthew C. Perry, Plano, TX (US)

(73) Assignee: Santera Systems, Inc., Plano, TX (US)

( * ) Notice: Subject to any disclaimer, the term of this patent is extended or adjusted under 35 U.S.C. 154(b) by 886 days.

(21) Appl. No.: 09/962,915

(22) Filed: Sep. 24, 2001

(65) Prior Publication Data

US 2002/0089938 A1    Jul. 11, 2002

Related U.S. Application Data

(60) Provisional application No. 60/234,852, filed on Sep. 22, 2000.

(51) Int. Cl.
H04L 12/28    (2006.01)
H04L 12/66    (2006.01)
H04M 3/42    (2006.01)

(52) U.S. Cl. ............... 370/260; 370/352; 370/401; 379/211.02

(58) Field of Classification Search ........ 370/260–265, 370/352–360, 389–395, 401–432, 473–475; 379/210–219, 221–229, 202–203; 709/228–230
See application file for complete search history.

(56) References Cited

U.S. PATENT DOCUMENTS

| | | | | |
|---|---|---|---|---|
| 5,930,698 A | * | 7/1999 | Bertacchi | 455/405 |
| 5,940,491 A | * | 8/1999 | Anderson et al. | 379/230 |
| 6,094,478 A | * | 7/2000 | Shepherd et al. | 379/211.02 |
| 6,097,804 A | * | 8/2000 | Gilbert et al. | 379/230 |
| 6,125,175 A | * | 9/2000 | Goldberg et al. | 379/201.01 |
| 6,148,277 A | | 11/2000 | Asava et al. | |
| 6,236,722 B1 | * | 5/2001 | Gilbert et al. | 379/230 |
| 6,307,929 B1 | * | 10/2001 | Baiyor et al. | 379/211.02 |
| 6,324,279 B1 | * | 11/2001 | Kalmanek et al. | 379/229 |
| 6,337,858 B1 | * | 1/2002 | Petty et al. | 370/356 |
| 6,349,136 B1 | * | 2/2002 | Light et al. | 379/202.01 |
| 6,366,660 B1 | * | 4/2002 | Baiyor et al. | 379/211.01 |
| 6,373,930 B1 | * | 4/2002 | McConnell et al. | 379/114.28 |
| 6,434,402 B1 | * | 8/2002 | Davison et al. | 455/555 |
| 6,453,022 B1 | * | 9/2002 | Weinman, Jr. | 379/88.13 |
| 6,574,325 B1 | * | 6/2003 | Baiyor et al. | 379/211.01 |
| 6,674,842 B1 | * | 1/2004 | Weinman, Jr. | 379/88.13 |
| 6,693,886 B1 | * | 2/2004 | Haikonen et al. | 370/338 |
| 6,847,634 B1 | * | 1/2005 | Pearce et al. | 370/352 |
| 6,967,957 B1 | * | 11/2005 | Anjum et al. | 370/401 |
| 2001/0028654 A1 | * | 10/2001 | Anjum et al. | 370/401 |
| 2002/0024943 A1 | * | 2/2002 | Karaul et al. | 370/338 |
| 2005/0036596 A1 | * | 2/2005 | Merchant | 379/114.01 |

FOREIGN PATENT DOCUMENTS

EP    0805576    11/1997

* cited by examiner

*Primary Examiner*—Man U. Phan
(74) *Attorney, Agent, or Firm*—Haynes and Boone, LLP

(57) ABSTRACT

A system and method of distributed multi-party call control are provided. The method includes the steps of establishing a first leg of a multi-party call, adding a second leg of the multi-party call, associating the second leg with the first leg of the multi-party call, determining which of the first leg or the second leg to be the controlling or controlled legs of the multi-party call, and requesting a voice path to the controlled leg by the controlling leg to establish the multi-party call.

18 Claims, 4 Drawing Sheets

Figure 1:
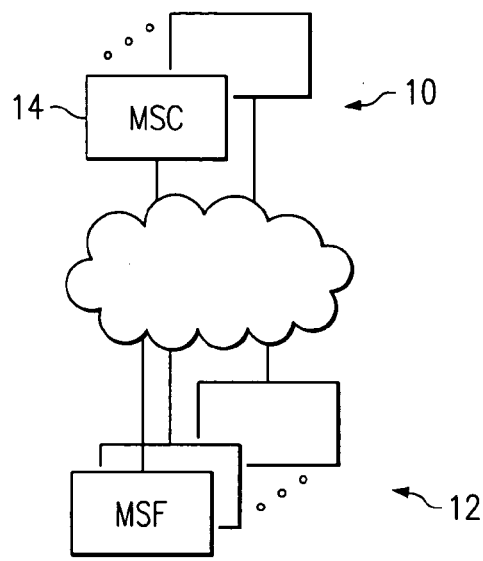

SYSTEM AND METHOD FOR DISTRIBUTED MULTI-PARTY CALL CONTROL

RELATED APPLICATIONS

The present application claims priority to patent application Ser. No. 60/234,852, entitled "System and Method for Distributed Multi-Party Call Control", filed on Sep. 22, 2000.

TECHNICAL FIELD OF THE INVENTION

This invention relates to telecommunications equipment, and more particularly, to a system and method for distributed multi-party call control.

BACKGROUND OF THE INVENTION

In a distributed pooled call manager architecture, multiple call managers reside in multiple processing platforms and process calls in a load-sharing mode. This architecture provides the advantage of flexibility, scalability, reliability, and geographical diversity. However, such architecture presents a dilemma in processing multi-party calls. Although the originator and terminator of a single call leg can be guaranteed to be processed by the same call manager, the multiple legs involved in a multi-party call are likely to be processed by different call managers on different processing platforms. Therefore, coordination between the call managers of the various legs of a multi-party call is required.

SUMMARY OF THE INVENTION

In order to enjoy the full benefits and advantages of a distributed call processing architecture, it is imperative that a protocol to coordinate the various legs of the multi-party call is provided. The present invention provides a way for call managers residing across different processing platforms to communicate and establish control of the multi-party calls.

In accordance with an embodiment of the present invention, a method of inter-call manager call control includes the steps of establishing a first leg of a multi-party call, adding a second leg of the multi-party call, associating the second leg with the first leg of the multi-party call, determining which of the first leg or the second leg to be the controlling or controlled legs of the multi-party call, and requesting a voice path to the controlled leg by the controlling leg to establish the multi-party call.

In accordance with another embodiment of the present invention, a method of setting up a multi-party call includes the steps of establishing a two-party call between an originator and a terminator, the two-party call forming a first leg of a multi-party call. Thereafter creating a second leg of the multi-party call involving the originator or terminator of the two-party call and a new terminator or a new originator of the second leg. The method then includes the steps of determining which of the first leg or the second leg to be the controlling or controlled legs of the multi-party call, and requesting a voice path to the controlled leg by the controlling leg to establish the multi-party call.

In accordance with yet another embodiment of the present invention, a distributed call manager architecture includes a first call manager residing on a first processor and processing an original leg of the multi-party call between an originator and a terminator, and a second call manager residing on a second processor and processing a new leg of the multi-party call, and sending to the first call manager a request to attach to the original leg of the multi-party call, the second call manager further sending to the first call manager a request to play an alert tone to a new terminator of the new leg of the multi-party call, the second call manager further sending to the first call manager a request to make a voice path from the new leg to the original leg of the multi-party call.

In accordance with another embodiment of the present invention, a distributed call manager architecture includes a first call manager residing on a first processor and processing an original leg of the multi-party call between an originator and a terminator, the first call manager requesting an initiation of a new leg of the multi-party call, and a second call manager residing on a second processor and processing the new leg of the multi-party call, and sending to the first call manager a request to make a voice path from the new leg to the original leg of the multi-party call to a new terminator.

BRIEF DESCRIPTION OF THE DRAWINGS

For a more complete understanding of the present invention, the objects and advantages thereof, reference is now made to the following descriptions taken in connection with the accompanying drawings in which:

FIG. 1 is a simplified block diagram of an integrated media switching platform according to an embodiment of the present invention;

FIG. 2 is a more detailed block diagram of am embodiment of the multi-service switching hub according to the teachings of the present invention;

FIG. 3 is a diagram of an exemplary multi-party call scenario;

FIGS. 4A and 4B are diagrams of a call waiting scenario;

FIGS. 5A and 5B are diagrams of a three-party call scenario; and

FIGS. 6A and 6B are diagrams of a operator barge-in call scenario.

DETAILED DESCRIPTION OF THE DRAWINGS

The preferred embodiment of the present invention and its advantages are best understood by referring to FIGS. 1 through 6B of the drawings, like numerals being used for like and corresponding parts of the various drawings.

FIG. 1 is a simplified block diagram of a distributed processing system 10 set in a telecommunications environment. In particular, system 10 is an integrated media switching platform. System 10 includes one or more multi-service fabric (MSF) 12 coupled to one or more multi-service controllers (MSC) 14 via a network. Multi-service controllers (MSC) 14 perform call processing control and user interface functions for integrated media switching platform 10. Multi-service fabric (MSF) 12 provides the physical resources of a switching fabric for routing telephony calls, video data, facsimile data, Internet traffic, and other data. Multi-service fabric 12 is operable to interface with various signaling protocols, including ISUP (ISDN User Part) SS7 (Signaling System Number 7), GR-303, ISDN (Integrated Services Digital Network) PRI (Primary Rate Interface), in-band signaling, ATM (Asynchronous Transfer Mode), IP (Internet Protocol), and frame relay.

Referring to FIG. 2, a more detailed block diagram of the integrated media switching platform 10 is shown. Multi-service fabric 12 is coupled to multi-service controllers 14 and 15 via a network, or network switches such as Ethernet switches 16 and 17. Multi-service controllers 14 and 15 perform call processing control and user interface functions. Multiple multi-service controllers may be grouped together to form an MSC complex. Multi-service controllers may operate in a load-sharing mode or in an active-standby mode. Multi-service controllers 14 and 15 each includes a call manager for processing calls. In this manner, the call processing architecture is distributed across multiple processing platforms. Multi-service fabric 12 is a switching fabric for routing telephony calls, video data, facsimile data, Internet traffic, and other data. Signaling gateways (SGW) 20 and 21 interface to the SS7 network 22. Multi-service fabric 12 and multi-services controllers 14 and 15 interface with various networks using different signaling protocols, such as the PSTN (public switching telephony network) 24 using CAS (Channel-Associated Signaling) protocol, with customer premises equipment (CPE) 26 such as a private branch exchange (PBX) using PRI signaling protocol, with an integrated digital loop carrier (IDLC) 28 using GR-303 protocol, and with asynchronous transfer mode network 30 using user network interface (UNI). Ethernet switches 16 and 17 also couples multi-service fabric 12 and multi-service controller 14 and 15 with network management system (NMS) 32 using SNMP (simple network management protocol) and element management subsystem (EMS) user interface 34. Ethernet switches 16 and 17 also couple signaling gateways (SGW) 20 and 21 to multi-service controllers 14 and 15.

Figure 3:
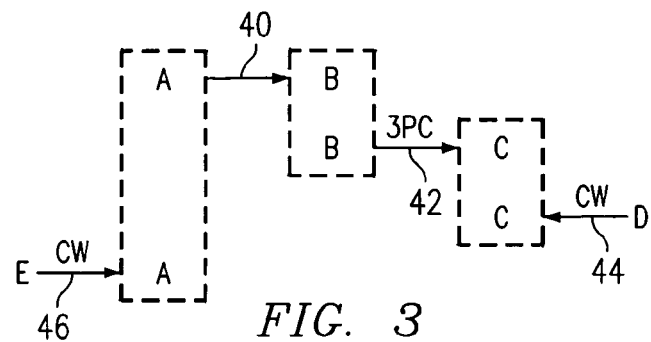

Referring to FIG. 3, an example of multiple multi-party call scenario is shown. According to the present invention, multi-party calls are conceptualized as collections of two-party calls. Party A is talking to party B, which forms the first leg 40 of the multi-party call. In this scenario, party A is the originator of the call and party B is the terminator of the call, as indicated by the direction of the arrow. Party B then initiates a new leg 42 from the existing call to party C to form a three party call (3PC). Party B is the originator of the second leg 42 of the multi-party call and party C is the terminator of the call. In a system having a distributed call processing architecture, the call manager that controls the first leg 40 of the call may reside on a different processor than the call manager that controls the second leg of the call 42. While parties A, B and C are in a three party call, party D attempts to call party C, which is the terminator of the second leg of the call 42. Parties B and D therefore form a call waiting (CW) leg 44 of the multi-party call. Another party, party E, then attempts to reach party A, which forms another call waiting leg 46 of the multi-party call, with party A as the terminator of this leg. Each of these legs of the multi-party call may be processed by a call manager residing on a different processing platform in the distributed call model architecture. Therefore, there is a need to coordinate the various legs of the calls across distributed processors and to keep track of the different legs of the call.

According to the present invention, an inter-call manager messaging protocol is used to establish and break the association between two legs to form a multi-party call. For each multi-party call, there is a controlling leg and a controlled leg. There is further a party in the multi-party call that is the controller of the call. For example, in the scenario shown in FIG. 3, party B is the controller of the three-party call, party C is the controller of the first call waiting call, and party A is the controller of the second call waiting call. Therefore, the presentation avoided long chains of controller and controllees that necessitates complex control logic and coordination. Selected exemplary inter-call manager messaging protocol messages communicated between legs of a multi-party call include:

ATTACH_REQ and RESP—the sending leg forms attachment to an existing call leg for call waiting or operator barge-in. The sending leg is the controlling leg.

INITIATE_REQ and RESP—the sending leg requests a new leg be started for three-party calling. The receiving leg is the controlling leg once it is established.

DETACH_REQ/RESP—The controlling leg is telling the controlled leg that it is detaching from the call. The controlled leg may or may not continue the call as a normal two-party call depending on the data in the detach request. A race condition can occur between the controlled and controlling legs both disconnecting at the same time. In that case, the RELEASE_NOTIFICATION and DETACH_REQ pass each other with each leg thinking the other will continue in the call. The responsibility of catching this race condition and dealing with it falls on the controlling leg. The controlling leg uses the incoming CM_DETACH_RESP to determine if the race condition has occurred or not.

RELEASE_NOTIFICATION—The controlled leg informs the controlling leg it is releasing. This is typically due to the release of the mate since the controlling leg would handle a release of the controlling party.

PATH_REQ/RESP—The controlling leg makes a voice path request to the controlled leg to execute. The PATH_REQ message has the following five command options:

CWALERT—Request controlled leg to apply CW ALERT tone to the shared channel. This is the one case in which the controlled leg performs this sort of work on behalf of the controlling leg. The reason for this is the controlled leg's voice path is to remain intact during the CW Alert phase.

MOVE—Request the controlled leg to move the shared channel to the connection context owned by the controlling leg. After a successful move, the controlling leg is free to modify the attributes of the channel in its context. The original mate is placed on hold.

MOVEBACK—Request the controlled leg to move the shared channel back to its context. The voice connection to the original mate can be resumed.

MATE_INVITATION—Invites the mate channel (on the controlled leg) of the shared channel into the controlling leg's context. The original mate is free to joint in the context or not depending on its activities (for example, it may be in its own multi-part scenario). The original mate is also free to leave the context when it needs to. An example of this use is for a three party call where the original mate is brought into the bridge with the controller and the new mate. The original mate is invited to join the bridge.

BARGE_IN—The controlling leg sends this message to ask the controlled leg to add the indicated channel into a connection with the shared channel. The resulting connection may or may not need a bridge depending on the connection state of the controlled leg.

Figure 4A:
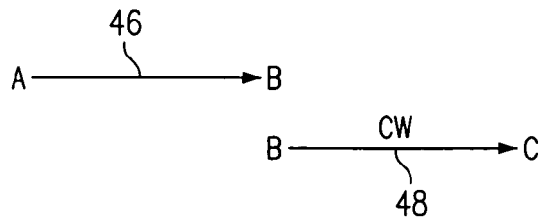
Figure 4B:
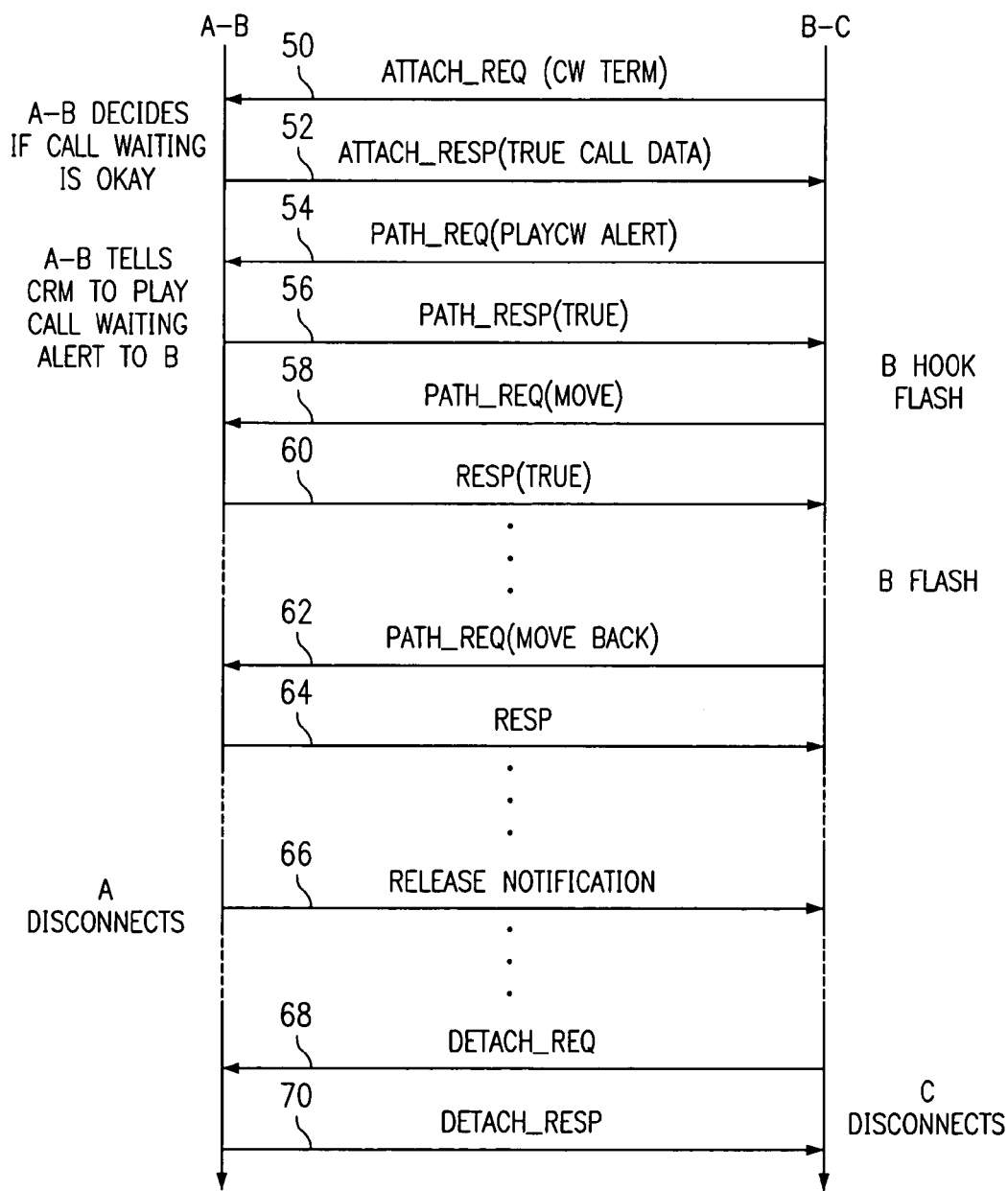

FIGS. 4A and 4B are illustrative of the call waiting call protocol according to an embodiment of the teachings of the present invention. In this example, party A and B form a first leg 46 of the multi-party call, with party A being the originator and party B being the terminator. Party C then calls party B to form a call waiting leg 48 of the multi-party call. The call waiting leg begins as any normal termination attempt to a subscriber. In call waiting, the termination attempt is made to a busy subscriber with the call waiting feature. According to the present invention, a party of the original call, which is the terminator of the call waiting leg (in this case party B), becomes the controller of the call waiting call. The voice path control for the original leg of a multi-party call falls under the control of the added leg. Having the added leg control the multi-party call as opposed to having the two legs operate as peers provides a clear single-point of control.

Referring to FIG. 4B, the call manager controlling the call waiting leg 48 between parties B and C sends an ATTACH_REQ (CW, TERM) message 50 to the call manager controlling the original call 46 to request attaching to the original call. The CW parameter indicates call waiting, and the TERM parameter indicates attachment to the terminator of the original call. The call manager of the A-B leg validates the request and decides if conditions are stable to allow call waiting and responds with ATTACH_RESP (TRUE, CALL DATA) message 52 to allow call waiting between parties B and C. The call manager of the A-B leg then enters a controlled mode. The call manager of the B-C leg 48 then sends a PATH_REQ (PLAY CW ALERT) message 54 to request that an alert tone be applied to party B to inform the subscriber that there is another caller on the line. The connection resource manager (CRM) then applies the alert tone to party B, and responds with a PATH_RESP (TRUE) message 56. The controller of the call waiting call is party B, who may accept the incoming call from party C with an initial hookflash. This results in a PATH_REQ (MOVE) message 58 being sent from the B-C leg call manager to the A-B leg call manager to move the shared channel to the new leg's context. With the response of true (message 60) from the A-B call manager, party C is connected with party B and party A is put on hold. Thereafter if B flashes, a PATH_REQ (MOVE BACK) message 62 is generated and sent to the A-B leg call manager to move shared channel back to the original leg. When a response true message 64 is returned, party B is connected with party A again and party C is put on hold. Subsequent flashes by party B toggles the subscriber between party A and party C. When party A disconnects, the A-B leg call manager sends a release notification message 66 to the B-C leg call manager and takes down the A-B leg and leaves the B-C leg in a normal two-party call.

If party A were the party on hold when it disconnects, no indication is provided to the other parties that party A went on hook. If party A were not the party on hold, party B, the controller, is connected to the party on hold. On the other hand, disconnection by the controller (party B) causes a ringing tone to be applied to the controller so that the party on hold is not left behind. The ringing of the controller is done as a continuation of the call, as opposed to tearing down the call and attempting to re-establish a new call. Keeping the call in place avoids race conditions and other possible error conditions.

Returning to the example in FIG. 4B, party C disconnects and the B-C leg call manager informs the A-B leg call manager with a DETACH_REQ message 68. With the detach request message 68, the controlling leg is telling the controlled leg that it is detaching from the call. The A-B leg call manager then responds with a DETACH_RESP message 70 to tear down the call.

Figure 5A:
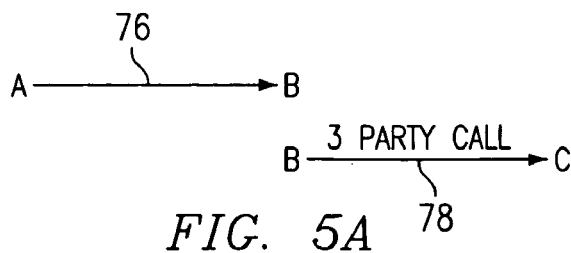
Figure 5B:
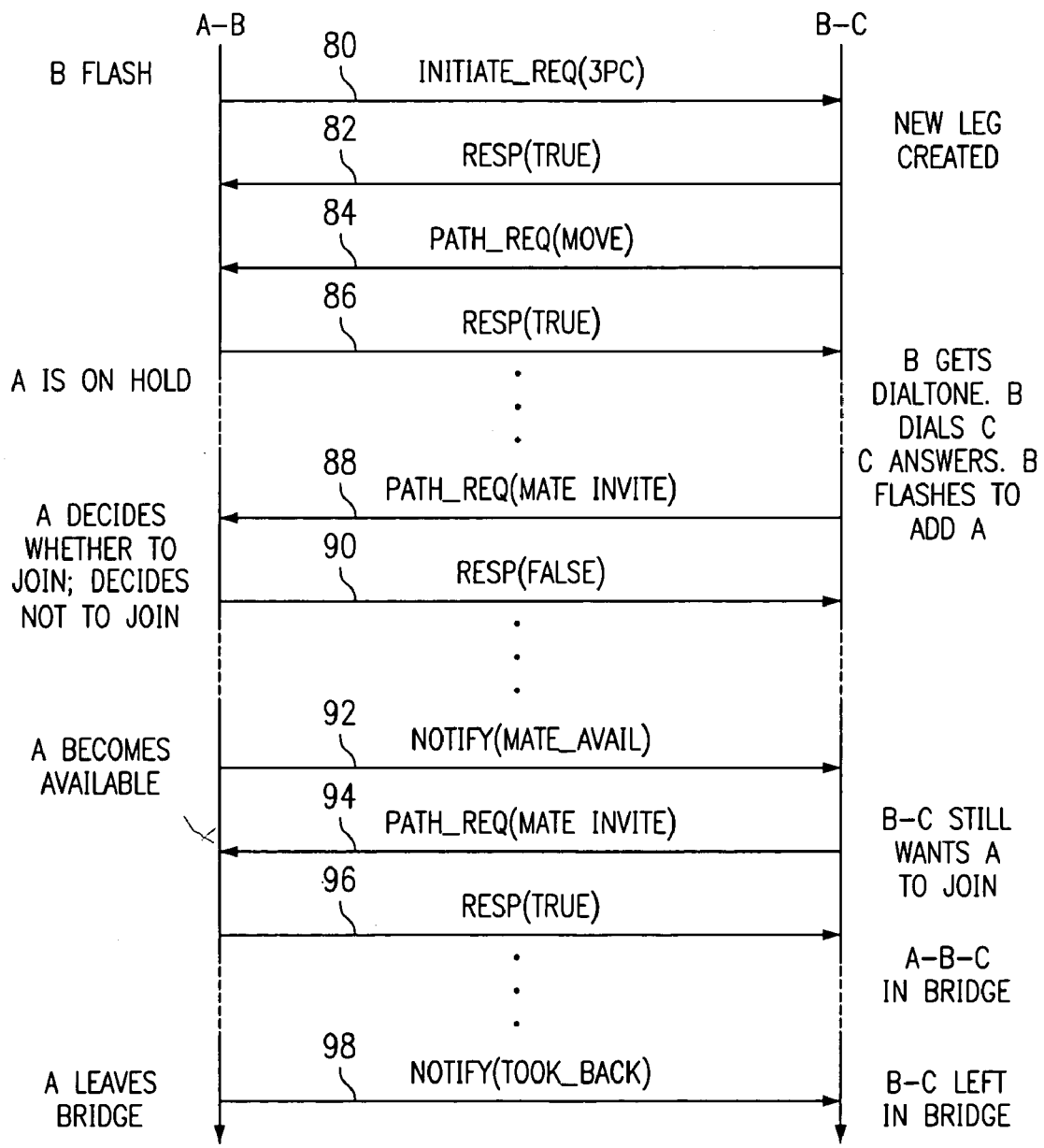

FIGS. 5A and 5B are illustrative of a three-party call scenario according to an embodiment of the present invention. Party A and Party B were engaged in a normal two-party call (leg 76) and then party B calls party C to initiate a new leg 78 to form a three-party call. Either the originator or the terminator of the original two-party call may initiate the call to the third party. The originator of the third-party call, in this example, party B, hook flashes. If certain conditions are met, such as the call is in a stable state, the originator is not currently controlling a multi-party call, etc., then motions are set to add a new leg to the original call. Because the three-party call leg 78 originates from a party in the call, the same call manager instance may be employed to control the three-party call leg 78 to eliminate inter-node traffic, but this is not required. The protocol is the same whether the same call manager is used for the second leg 78 of the call. In order to more clearly illustrate the three-party call scenario, a second call manager is shown and will be referred to as the second call manager or the B-C leg call manager.

The first call manager sends an INITIATE_REQ (3PC) message 80 to the second call manager, and the new leg is created. Because party B is the initiator of the three-party call leg, it is the controller for the multi-party call. The INITIATE_REQ message may include the extended channel ID, extended terminator ID, signaling ID, mate type (TDM or ATM), source transaction ID, and destination transaction ID. The B-C leg call manager returns a TRUE response 82 to indicate that the new leg is successfully created. A PATH_REQ(MOVE) message 84 is sent from the B-C leg call manager to the A-B leg call manager to request that the controlled leg (A-B leg) to move the shared edgepoint to a new matrix context owned by the controlling leg (B-C leg). A RESPONSE(TRUE) message 86 returned to the B-C leg call manager indicates that this task has been performed. Party A is put on hold, and party B is provided a dial tone and is allowed to dial the telephone number of the third party. When the terminator address is known, a bridge is reserved in the B-C leg. If the reservation fails, party B is given a reorder tone and the call is not placed to party C. Otherwise, party C is added to the leg for the outgoing call attempt and party B is free to flash again to ask party A to join the call. A PATH_REQ (MATE INVITE) message 88 is sent to the A-B leg call manager to invite party A to join the three-party conference. If party A decides not to join the conference call or is not available (such as being involved in a call waiting leg, not shown), the A-B leg call manager sends a RESP (FALSE) message 90 to the B-C leg call manager. Parties B and C are then in the bridge by themselves. At a later time, party A becomes available, and the A-B leg call manager sends a NOTIFY (MATE_AVAIL) message 92 to the B-C leg call manager. If B and C still wants A to join, a PATH_REQ(MATE INVITE) message 94 is again sent to the A-B leg call manager. This time, the response is true (message 96), so that parties A, B and C are all in the bridge and in the conference call. A may leave the bridge at a later time and the A-B leg call manager sends a NOTIFY (TOOK_BACK) message 98 to the B-C leg call manager to move A back. Parties B and C are then left in the bridge.

Disconnect by either mate party causes the remaining two parties to go to a normal two-party call and releases the bridge. If the remaining mate was on hold, a short pause is given before joining the mate and the controller. Disconnect by party B, the controller, terminates the three-party call and releases the bridge. Any mate that was connected at the time of subscriber disconnect is released. If the original mate was on hold, ringing is applied to the controller in an attempt to bring it back into a call with the held party.

Figure 6A:
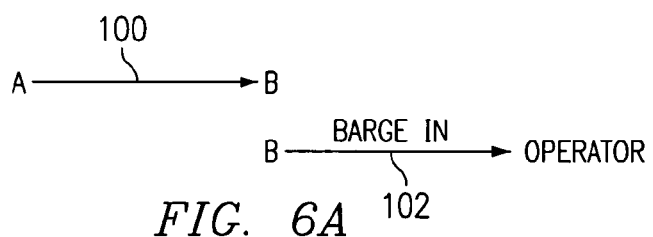
Figure 6B:
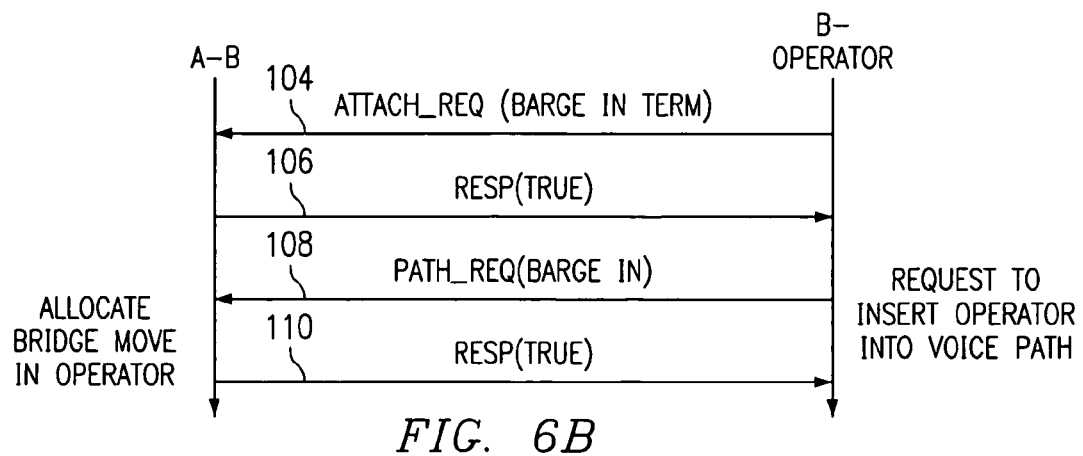
Figure 2:
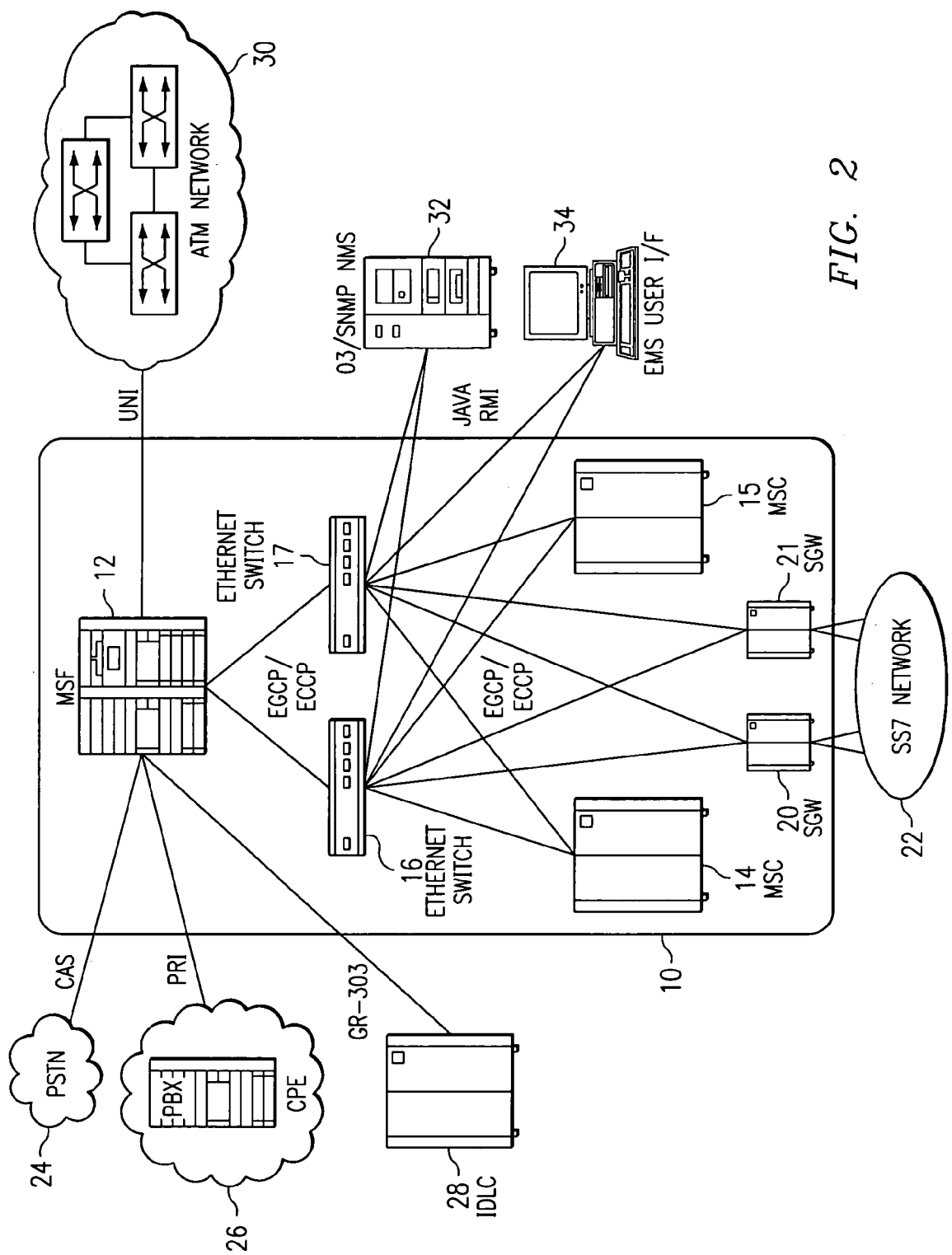

Referring to FIGS. 6A and 6B, an example of an operator barge-in call scenario according to an embodiment of the present invention is shown. Parties A and B are in a two-party call (call leg 100) where A is the originator and B is the terminator. An operator barge-in leg 102 is then performed to inject a two-way path to an operator into the existing call. The operator system may use barge-in to tap into the call for either Busy Line Verification (scrambled voice) or Operator Interrupt (OSS provides interrupt tone followed by two-way communication with the operator). Barge-in is initiated by either an origination from a CAS trunk with the Busy Verification (BV) attribute set in the database, or from an ISUP trunk group. In the CAS case, the dialed digits are the dialed number (DN) of the subscriber to be tapped (party B, for example). In the ISUP case, the DN is the barge-in access number (1159 or 11591, for example) and the Generic Address provides the DN. The operator trunk is then dropped into a bridge with the existing call.

Referring to FIG. 6B, an ATTACH_REQ (BARGE-IN, TERM) message 104 is sent from the call manager of the operator to the A-B leg call manager. The A-B leg call manager responds with a RESP (TRUE) message 106. The operator-B leg is the controlling leg. The operator-B leg call manager then sends a PATH_REQ (BARGE IN) message 108 to the A-B leg call manager to request the controlled leg to add the indicated channel into a connection with the shared channel. The resulting connection may or may not need a bridge depending on the connection state of the controlled leg. A successful connection is acknowledged in a RESP (TRUE) message 110 from the A-B leg call manager.

Although not specifically illustrated to avoid repetition, a call transfer multi-party call is set up in a manner similar to the three-party call. The difference between the two types of calls occurs at controller disconnect. When a controller disconnects in the three-party call scenario, the bridge is torn down. When a controller disconnects in the call transfer scenario, all resources related to the controller are released but the legs remain active and a voice connection remains between the two mates of the call.

While the invention has been particularly shown and described by the foregoing detailed description, it will be understood by those skilled in the art that various changes, alterations, modifications, mutations and derivations in form and detail may be made without departing from the spirit and scope of the invention.

What is claimed is:

1. A method of inter-call manager messaging protocol, comprising:
   establishing a first leg between two first parties of a multi-party call;
   adding a second leg between a second party and one of the first parties of the multi-party call;
   associating the second leg with the first leg of the multi-party call;
   determining which of the first leg or the second leg to be the controlling or controlled legs of the multi-party call; and
   requesting a voice path to the controlled leg by the controlling leg to establish the multi-party call;
   wherein requesting the voice path comprises requesting the controlled leg to move a shared channel between the first and second legs to a connection context of the controlling leg.

2. The method, as set forth in claim 1, further comprising informing the controlled leg, by the controlling leg, that it is detaching from the multi-party call.

3. The method, as set forth in claim 1, further comprising informing the controlling leg, by the controlled leg, that it is releasing the multi-party call.

4. The method, as set forth in claim 1, further comprising:
   sending, by the second leg, a request to attach the second leg to the first leg; and
   determining the second leg as the controlling leg.

5. The method, as set forth in claim 1, further comprising:
   sending, by the first leg, a request to initiate the second leg; and
   determining the second leg as the controlling leg.

6. The method, as set forth in claim 1, wherein requesting the voice path comprises requesting the controlled leg to apply an alert tone to a shared channel between the first and second legs.

7. The method, as set forth in claim 1, wherein requesting the voice path comprises requesting the controlled leg to move a shared channel between the first and second legs back to its own context.

8. The method, as set forth in claim 1, wherein requesting the voice path comprises requesting, by the controlling leg, the controlled leg to add a channel into a connection with a shared channel between the first leg and the second leg.

9. A method of setting up a multi-party call, comprising:
   establishing a two-party call between an originator and a terminator, the two-party call forming a first leg of a multi-party call;
   creating a second leg of the multi-party call involving the originator or terminator of the two-party call and a new terminator or a new originator of the second leg;
   determining which of the first leg or the second leg to be the controlling or controlled legs of the multi-party call; and
   requesting a voice path to the controlled leg by the controlling leg to establish the multi-party call;
   wherein requesting the voice path comprises requesting the controlled leg to move a shared channel between the first and second legs to a connection context of the controlling leg.

10. The method, as set forth in claim 9, further comprising informing the controlled leg, by the controlling leg, that it is detaching from the multi-party call.

11. The method, as set forth in claim 9, further comprising informing the controlling leg, by the controlled leg, that it is releasing the multi-party call.

12. The method, as set forth in claim 9, further comprising:
   sending, by the second leg, a request to attach the second leg to the first leg; and
   determining the second leg as the controlling leg.

13. The method, as set forth in claim 9, further comprising:
   sending, by the first leg, a request to initiate the second leg; and
   determining the second leg as the controlling leg.

14. The method, as set forth in claim 9, wherein requesting the voice path comprises requesting the controlled leg to apply an alert tone to a shared channel between the first and second legs.

15. The method, as set forth in claim 9, wherein requesting the voice path comprises requesting the controlled leg to move a shared channel between the first and second legs back to its own context.

16. The method, as set forth in claim 9, wherein requesting the voice path comprises requesting, by the controlling leg, the controlled leg to add a channel into a connection with a shared channel between the first leg and the second leg.

17. The method, as set forth in claim 9, further comprising:

designating the terminator of the second call leg as the controller of the multi-party call; and disconnecting by the controller results in a ring-back to the controller to bring the controller back into the multi-party call.

18. The method, as set forth in claim 9, further comprising:

designating the originator of the second call leg as the controller of the multi-party call; and disconnecting by the controller results in a two-party call between the terminator of the second call leg and the remaining party of the original two-party call.

* * * * *